Figure 1:
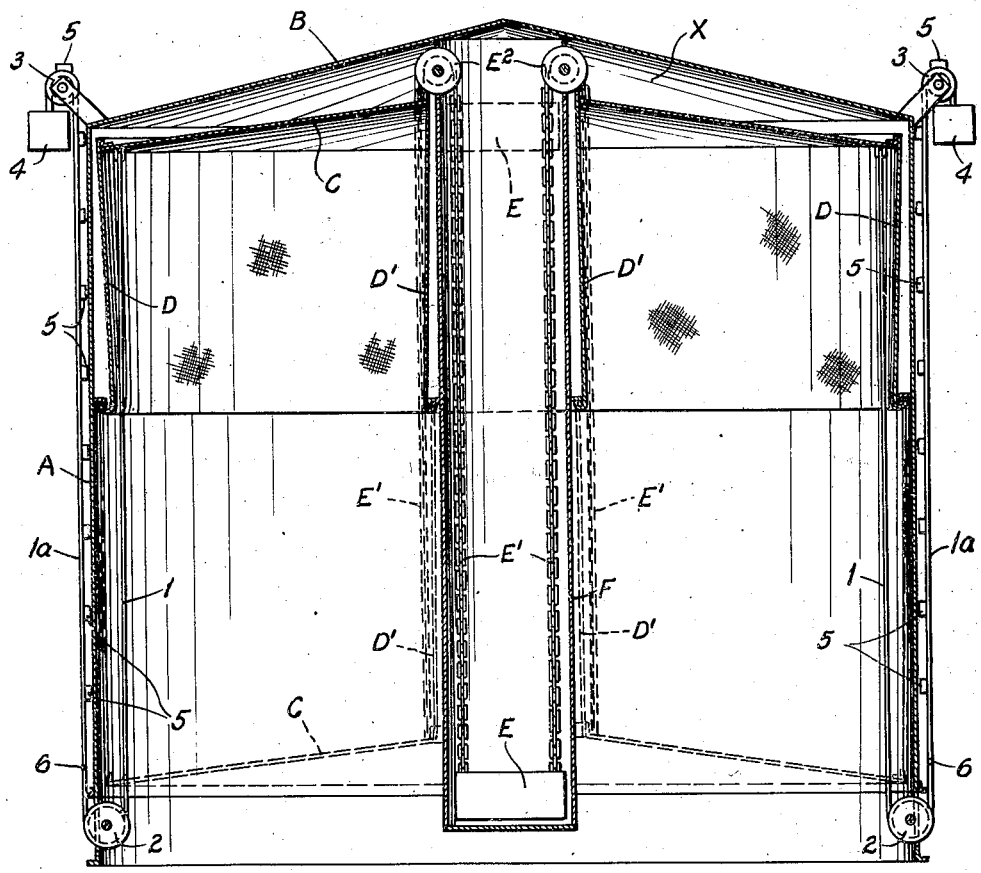

INVENTOR:
JOHN H. WIGGINS

Feb. 4, 1947.  J. H. WIGGINS  2,415,322
PRESSURE CONTROL MECHANISMS FOR FLUID STORAGE APPARATUS
Filed Dec. 24, 1943  2 Sheets-Sheet 2

INVENTOR:
JOHN H. WIGGINS
BY Wells L. Church
ATTORNEY

_Patented Feb. 4, 1947_                                                         2,415,322

UNITED STATES PATENT OFFICE 2,415,322

PRESSURE CONTROL MECHANISM FOR
FLUID STORAGE APPARATUS

John H. Wiggins, Chicago, Ill.

Application December 24, 1943, Serial No. 515,614

1 Claim. (Cl. 48—178)

This invention relates to storage apparatus for gases and liquids, and particularly apparatus of the kind in which gas-tight fabric or other suitable flexible material, is used to form a gas-tight seal or seals between a tank or container and a counterweighted, vertically-movable piston or equivalent member in the container that co-acts with a portion of the container to form a storage chamber of variable volume in which a fluid is confined. Apparatus of the general type above referred to are shown in my U. S. Patents Nos. 2,050,685 and 2,050,686, dated August 11, 1936, No. 2,102,299, dated December 14, 1937, and in my co-pending application Serial No. 363,835, filed November 1, 1940.

In apparatus of the general type or kind above referred to, the space between the piston and the side wall of the container is sealed by a fabric element attached to said side wall and to the piston in such a way that during the rise and fall of the piston, the end portion or edge portion of the sealing element that is attached to the piston, hangs from the piston, or is suspended from the piston. Accordingly, as the piston moves upwardly, the weight of said sealing element imposes a load on the piston which increases gradually as the piston rises higher, and as the piston moves downwardly, the load exerted on the piston by said sealing element gradually diminishes to a point where the weight of the sealing element exerts no load on the piston when the piston is at the end of its downward stroke. The changing load on the piston as it rises and falls, created by the weight of the flexible sealing element, produces a variation in the internal pressure of the storage chamber that has a tendency to cause said sealing element to bulge, belly, or wrinkle excessively, thereby straining the fabric or flexible material from which said element is constructed. For example, if the counterweighting mechanism for the piston is adjusted or constructed so as to balance the piston when the storage chamber is empty and the piston is at the end of its upward stroke, the admission of gases to the storage chamber causes the piston to move downwardly, and as the downward movement of the piston continues, the internal pressure in the storage chamber increases, due to the fact that the load imposed on the piston by the weight of the flexible sealing element diminishes progressively during the downward travel of the piston. This pressure in the storage chamber in excess of the pressure required to overbalance the counterweighting mechanism and cause or permit the piston to move downwardly, causes the flexible sealing element at the peripheral edge of the piston to bulge or belly inwardly excessively, away from the side wall of the container, with the result that injurious wrinkles or folds are produced in said sealing element. To state it in another way, if the piston is balanced in its top position by the counterweighting mechanism of the piston, then as the piston is pushed downwardly by pressure in the storage chamber, the pressure required becomes greater, due to decreasing the weight of the piston, by dropping progressively the weight of the sealing element, the piston carrying the full weight or load of said sealing element when it is in its top position, and carrying no weight of said sealing element when the piston is in its bottom position, or at the end of its downward stroke. The above mentioned excess pressure that is thus set up in the storage chamber is objectionable, as it produces excessive wrinkling of the sealing element and prevents said element from hanging vertically in a flabby condition from the peripheral edge of the piston. In instances where the gases being stored are heavier than air, this objectionable pressure effect may be accentuated.

My invention has for its main object to provide a novel means for preventing such excessive bulging, bellying or wrinkling of the flexible sealing element at the peripheral edge of the piston or vertically-movable member of an apparatus of the general type referred to.

Another object of my invention is to provide an apparatus of the general type referred to, which is of such construction or design that the pressure in the storage chamber will not vary to such an extent or degree as to produce excessive or objectionable bulging, bellying or wrinkling of the flexible sealing element attached to the peripheral edge of the piston.

Another object is to provide an apparatus of the general kind referred to, that has provision for accurately regulating or controlling the pressure in the storage chamber.

And still another object of my invention is to provide an apparatus of the general kind referred to, that is equipped with a means accessible from the exterior of the apparatus, for varying or regulating the pressure that exists or which is created in the storage chamber, when said chamber contains or is filled with a fluid. Other objects and desirable features of my invention will be hereinafter pointed out.

In the accompanying drawings I have illustrated my present invention applied to a gas holder of the general construction disclosed in my pending application for Patent Serial No. 363,835, filed November 1, 1940, which comprises a counterweighted piston, a stationary, tubular member projecting upwardly through a center hole in the piston so as to serve as a support for some of the elements of the counterweighting mechanism for the piston, and two flexible sealing elements attached to the piston at its peripheral edge and at its center opening, so as to produce and maintain gas-tight joints between the piston and the side wall of the container, and between the piston and the member that projects upwardly through the piston, the piston and its counterweighting mechanism being so constructed and arranged that the piston is in its topmost position, or at the end of its upward stroke, when the storage chamber is empty. I wish it to be understood, however, that my invention is applicable to various other types and kinds of apparatus for storing fluids, such as, for example, an apparatus having an imperforate piston, and provided with only one flexible sealing element, or an apparatus whose piston constitutes the top wall of the storage chamber.

Figure 2:
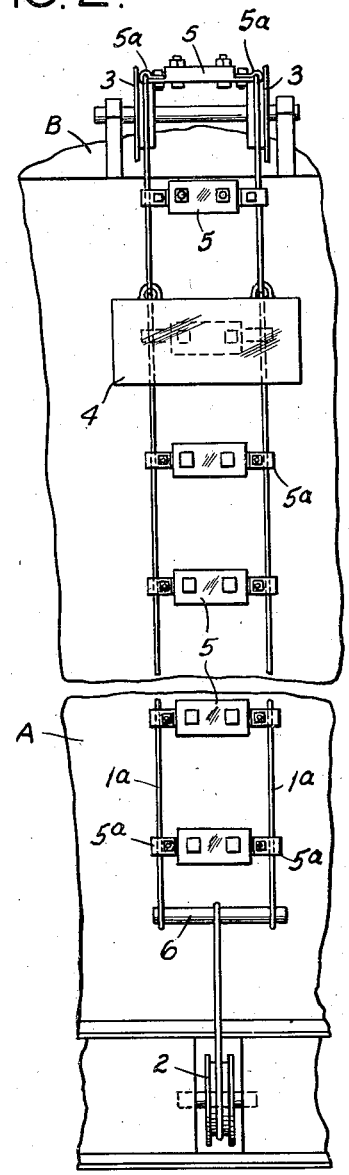
Figure 3:
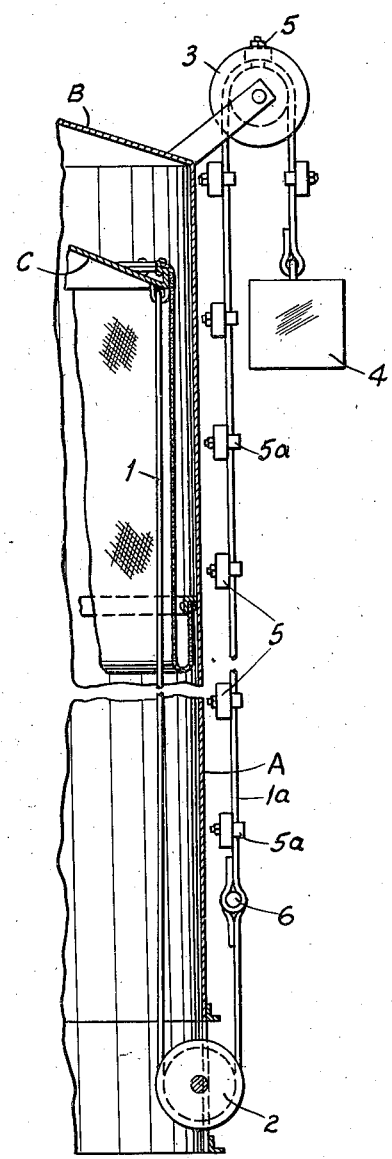

Figure 1 of the drawings is a vertical transverse sectional view of a gas holder embodying my present invention;

Figure 2 is a detail view, in side elevation, illustrating one way of detachably or adjustably mounting the control weights of the means that is used to balance the weight of the sealing element on the piston, or to compensate for the variation in the load exerted on the piston by the weight of the sealing element, when the piston rises and falls; and Figure 3 is a view at right angles to Figure 2, of the parts shown in said figure.

In the accompanying drawings, X designates the gas storage chamber of a gas holder provided with a stationary side wall A, a stationary roof or top B, and a bottom formed by a vertically-movable member or piston C, whose peripheral edge is connected by means of a gas-tight, flexible sealing element D, with the side wall A of the container, said sealing element D being of such length and being attached to the side wall A at such a point, that the piston C is capable of a relatively great vertical movement in traveling downwardly from its extreme upper position, shown in full lines in Figure 1, to its extreme lower position, shown in broken lines in said figure. A counterweighting mechanism is employed to balance the weight of the piston, said counterweighting mechanism being herein illustrated as comprising a weight E attached to chains or cables E' that lead upwardly from said weight over pulleys E², and thence downwardly to the piston, said cables or chains being attached to the piston. The weight E is housed inside of a vertically-disposed, tubular member F at the center of the container that projects upwardly through a center opening in the piston and which serves as a support for the roof B of the container and for the pulleys E² of the piston counterweighting mechanism. The space or joint between the piston and the center supporting member F is sealed and made gas-tight by a flexible sealing element D' attached to the piston and to the center member F.

During the upward travel of the piston C, part of the weight of the sealing elements D and D' is borne by the piston, inasmuch as said sealing elements are partially suspended from the piston. As the piston rises, the load exerted on the piston by said sealing elements D and D' increases progressively, and as the piston moves downwardly, said load progressively decreases or diminishes. My invention, briefly described, consists of a control mechanism for progressively applying a gradually increasing load to the piston during the downward travel of same, so as to compensate for the gradual diminution in the load exerted on the piston by the weight of the sealing elements D and D', during the downward travel of the piston, for the purpose of maintaining a substantially controlled or predetermined load on the piston during its downward stroke, and thus eliminating the possibility of an abnormal pressure building up in the storage chamber X. Similarly, during the upward travel of the piston, the means above referred to causes the piston to be progressively relieved from the load that was applied to the piston during the downward stroke, to compensate for the diminution in the load exerted on the piston by the weight of the sealing elements D and D'.

In an apparatus of the particular kind herein illustrated, which is of such construction that the piston is at the end of its upward stroke when the storage chamber is empty, and moves downwardly during the operation of admitting gases to said storage chamber, the control mechanism above referred to effectively prevents the pressure in the storage chamber from building up to such an extent as to cause the peripheral sealing element D to belly inwardly excessively during the downward travel of the piston, due to the fact that said mechanism in effect progressively adds weight to the piston as the weight exerted on the piston by the sealing elements D and D' gradually diminishes as the piston approaches its extreme downward position, shown in broken lines in Figure 1. The center sealing element D' is of such size and arrangement that there is no tendency for it to belly excessively.

The compensating means or control mechanism above described is herewith illustrated as comprising two cables, chains or equivalent flexible devices 1 attached to the piston C at diametrically opposite points and leading downwardly from same under pulleys 2 located adjacent the lower end of the side wall of the container, thence upwardly from said pulleys 2 over pulleys 3 arranged on the exterior of the container adjacent the upper end of the side wall A of same, and thence downwardly from the pulleys 3 to weights 4. The cables or chains 1 have associated with same adjustable or removable control weights 5 that are combined with said cables in such a way that they can be adjusted or set in various positions or disassociated from said cables.

Figures 2 and 3 of the drawings illustrate one way of combining the control weights 5 with the cables or chains 1. As shown in said figures, each of the chains or cables 1, after passing under the bottom pulley 2, leads upwardly to a cross bar 6 to which it is attached. Parallel chains, cables or equivalent devices 1ª that are attached to the cross bar 6, lead upwardly from same to a pair of top pulleys 3, and after passing over said pulleys, lead downwardly from same to the weight 4, previously referred to. The control weights 5 are adjustably or removably mounted on the two parallel cables 1ª in any suitable way, such, for example, as by means of clamps 5ª at the ends of the weights 5 that surround and frictionally grip the cables 1ª. The total weight of the control weights 5 of each set or group is only slightly less than the weight of the weight 4 of that set or group. Consequently, each of the weights 4 slightly overbalances the total or combined weight of the group of control weights 5 with which it co-acts, and exerts a pull on the cable 1 in a direction tending to cause the control weights 5 to pass over the top pulleys 3 and travel downwardly away from said pulleys, as hereinafter more fully explained. In the apparatus herein shown the total weight of the two groups of control weights 5 is just about equal to one-half, or any desired proportion, of the weight of the two sealing elements D and D' attached to the piston. Inasmuch as the cables 1 are attached at one end to the piston C, the weights 4 constantly exert a force or load on the piston C in a direction to move said piston downwardly. When said piston is in its extreme top position, shown in full lines in Figure 1, the control weights 5 of each group are arranged in opposed relation to the weights 4 with which they co-act, and, in effect, reduce the load which the weights 4 exert on the piston. During the downward travel of the piston, as the control weights 5 travel over the top wheels or pulleys 3, the effect is to pull down on the piston more and more, as the weight of the sealing elements hang on the piston less and less. Thus, the weight of the sealing elements on the piston is balanced, or partly balanced, or more than balanced, with the result that the pull of the chains or flexible devices E' of the piston counterweighting mechanism are either constant or varied, as desired, for all positions vertically of the piston C.

In effect, the control weights 5 of each group, as they travel over or across the axes of the top pulleys 3, during the downward movement of the piston, progressively increase the pull or load which the weights 4 exert on the piston. It will thus be seen that the weights 4, in conjunction with the control weights 5, constitute a variable loading means that progressively increases in weight as the load which the sealing elements exert on the piston diminishes. After passing over the top pulleys 3, the control weights 5 travel in the same direction as the piston, and they have the effect of making the piston progressively heavier as the piston descends. Notwithstanding the fact that the weights 5 descend during the downward travel of the piston, they have the effect of being progressively piled up on top of the piston. Thus, in an apparatus embodying my present invention, the control weights 5 constitute a loading and unloading means for the piston. The weights 4 constitute a counterweighting means for the control weights 5 and also a loading means for the piston. The weight E merely functions as a counterweighting means for the piston, assuming that the weight of the chains or cables E' of the piston counterweighting mechanism and the weight of the cables or chains 1 of my improved compensating mechanism are so light as to be practically ineffective.

In order to more clearly explain my invention, I will assume that when the piston is in its top position, or at the end of its upward stroke, the pressure in the gas storage chamber X is zero. Now, without the parts 1, 4 and 5 that constitute my compensating or control mechanism, assume that the dropping of the weight of the flexible sealing elements requires the pressure to increase to one-fourth inch water pressure when the piston is at the end of its downward stroke, as shown in broken lines in Figure 1, then by adding to the apparatus the parts 1, 4 and 5 of the compensating or control mechanism, the internal pressure of the storage chamber can be maintained at any amount below the one-fourth inch of water, even to pulling a minus pressure in the storage chamber X, if that be desired. Further, by varying the density of the control weights 5 along their vertical run, the pressure can be reduced for a certain distance of downward piston travel, and then increased again. I have found in sealing elements only 20 ft. high, that the internal gas pressure must be controlled to a very fine point. In the topmost position of the piston, for example, a vacuum of 0.01 inches of water will suck the peripheral sealing element D against the side wall A of the container and retard the upward movement of the piston. Also a pressure of $\frac{3}{32}$ inches of water in a position a little lower than the topmost position of the piston, will cause over a 2 ft. bulge at the bottom of the sealing element D, causing bad wrinkles or folds in said element. Therefore, the internal pressure of the gas storage chamber must be very delicately and positively controlled. In addition, when gases lighter or heavier than air are stored, then internal pressures or vacuums, due to the difference in specific gravity of the gas and air, are factors which have to be taken into consideration. In a gas holder constructed in accordance with my invention, the pressure can be controlled in any way that is necessary. Further, since the loading and unloading means for the piston is adjustable from the exterior of the container, the apparatus can be easily changed or modified to adapt it to the storage of fluids of different weights, simply by varying or changing the position of the control weights 5 on their supporting chains or cables 1$^a$. It is difficult to properly adjust or regulate gas holders of the type to which my invention relates, until the gas is stored in the storage chamber, but my invention makes accurate control or regulation possible, inasmuch as the regulating weights 5 of the compensating mechanism are easily accessible from the exterior of the apparatus. In instances where my invention is applied to or embodied in a gas holder of the kind in which the piston constitutes the top wall of the storage chamber, the operation will be under negative pressure with the same effect on the hang of the peripheral sealing element. The compensating or control mechanism would be built the same way, with the addition of suitable stuffing boxes installed in the bottom of the storage chamber for the cables or flexible devices 1 that lead downwardly from the piston to the bottom sheaves or pulleys 2, from which lead the portions of the cables 1 that sustain or carry the control weights 5.

From the foregoing, it will be seen that in an apparatus embodying my invention, the counterweighted piston or vertically-movable member that forms one wall of the storage chamber, is subjected to an auxiliary, variable load, which, in effect, adds weight to the piston and subtracts weight from the piston, in such a ratio as to compensate for the variation in the weight of the piston and its attached flexible sealing element or elements, resulting from the rise and fall of the piston. During the downward travel of the piston, when the weight or pull exerted on the piston by the weight of the flexible sealing element progressively diminishes, due to less and less of the weight of said sealing element being borne by the piston, the auxiliary load on the piston progressively increases in such a ratio as to insure that the weight of the piston, plus any load it carries, will remain within the desired range throughout the stroke of the piston. Similarly, when the piston moves upwardly, the weight of the auxiliary load on the piston diminishes progressively in such a ratio as to compensate for the progressive increase in the load on the piston, resulting from the piston rising higher, and thus causing more and more of the weight of the sealing element to be borne by the piston. As previously explained, by being able to control or govern the weight of the piston and its attached parts, in any and all positions of the piston during its rise and fall, I insure that the flexible sealing element at the peripheral edge of the piston will hang in the position it is intended to occupy and will not bulge inwardly excessively, away from the side wall of the container. Moreover, this highly desirable result is attained by a means or mechanism that is easily adjustable when the storage chamber is filled with the medium confined by or stored in the apparatus.

It is not necessary that two cables 1 and two sets of control weights 5 be employed, for the effect or result previously described could be obtained by a single set or group of control weights 5 combined with a single cable or equivalent flexible device 1, attached to the piston, preferably adjacent the center of the piston.

Apparatus of the kind above described vary in size from 20 feet in diameter x 15 feet high, to 200 feet in diameter or more, with correspondingly great heights. The piston may weigh from a few tons, to many tons, and the internal pressure of the storage chamber must be very finely regulated, since the flexible sealing element attached to the piston is really like the side wall of a flabby balloon and is subject to all the laws that govern such a structure. The sealing element or elements themselves weigh up to several tons.

Having thus described my invention, what I claim as new and desire to secure by Letters Patent is:

A fluid storage apparatus, comprising a vertically-movable member and a co-acting side wall that form parts of the storage chamber of the apparatus, a flexible sealing element attached to said member and side wall so as to hang suspended from the peripheral edge of said vertically-movable member, a counterweighting mechanism for said vertically-movable member, and a variable counterweighting mechanism for applying a variable load to said vertically-movable member during the rise and fall of said member, comprising a counterweighted cable leading downwardly from said vertically-movable member under a bottom guide and thence upwardly over a top guide set in spaced relation with said bottom guide, and a plurality of variable control weights on said cable that are adapted to travel in opposite directions over said top guide during the rise and fall of said vertically-movable member.

JOHN H. WIGGINS.

REFERENCES CITED

The following references are of record in the file of this patent:

UNITED STATES PATENTS

| Number | Name | Date |
|---|---|---|
| 2,102,299 | Wiggins | Dec. 14, 1937 |